US012607989B2

(12) United States Patent
Baughman et al.

(10) Patent No.: US 12,607,989 B2
(45) Date of Patent: Apr. 21, 2026

(54) PROACTIVE ALTERATION OF MACHINE BASED ON PREDICTED PROBLEM

(71) Applicant: INTERNATIONAL BUSINESS MACHINES CORPORATION, Armonk, NY (US)

(72) Inventors: Aaron K. Baughman, Cary, NC (US); Martin G. Keen, Cary, NC (US); Mauro Marzorati, Lutz, FL (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 18/366,999

(22) Filed: Aug. 8, 2023

(65) Prior Publication Data

US 2025/0053160 A1     Feb. 13, 2025

(51) Int. Cl.
  *G05B 19/418*          (2006.01)
(52) U.S. Cl.
  CPC .................. *G05B 19/41845* (2013.01); *G05B 2219/33315* (2013.01)
(58) Field of Classification Search
  CPC ................ G05B 19/41845; G05B 2219/33315
  See application file for complete search history.

(56) References Cited

U.S. PATENT DOCUMENTS 10,581,974 B2    3/2020   Sustaeta
10,762,475 B2    9/2020   Song 2008/0109114 A1*  5/2008   Orita ................... H02J 7/00047
                                                    901/50
2015/0148951 A1*  5/2015   Jeon ..................... G05D 1/0274
                                                    901/30
2015/0148955 A1*  5/2015   Chin ..................... B25J 9/1602
                                                    901/41

(Continued)

FOREIGN PATENT DOCUMENTS

CN        112800668  A       5/2021

OTHER PUBLICATIONS

Ayani, et al., "Digital Twin: Applying emulation for machine reconditioning", Elsevier, Science Direct, 51st CIRP Conference on Manufacturing System, 2018, pp. 243-248.

*Primary Examiner* — Kamini S Shah
*Assistant Examiner* — Mohammed Shafayet
(74) *Attorney, Agent, or Firm* — Robert R. Aragona

(57)                ABSTRACT

An embodiment for altering a machine based on a predicted problem in a multi-machine environment is provided. The embodiment may include receiving data relating to an activity and functionalities of a primary machine in a multi-machine environment. The embodiment may also include executing a digital twin simulation of a digital twin model of the primary machine performing the activity in accordance with the functionalities. The embodiment may further include identifying a problem condition with at least one component of the primary machine in executing one or more steps of the activity. The embodiment may also include in response to determining the primary machine is not capable of performing an alternative activity with the problem condition, deploying one or more secondary machines having at least one substitute component for the at least one component of the primary machine to collaborate with the primary machine.

14 Claims, 4 Drawing Sheets

300

(56)                 References Cited

U.S. PATENT DOCUMENTS

| | | | |
|---|---|---|---|
| 2017/0329297 A1* | 11/2017 | Gilman | ............. G05B 19/4097 |
| 2018/0040171 A1 | 2/2018 | Kundu | |
| 2018/0186451 A1 | 7/2018 | Erickson | |
| 2019/0033848 A1 | 1/2019 | Cella | |
| 2019/0147412 A1* | 5/2019 | Chiaramonte | ......... G06Q 10/20 |
| | | | 705/7.13 |
| 2019/0389064 A1* | 12/2019 | High | ........................ B25J 13/08 |
| 2022/0170818 A1 | 6/2022 | Sundararajan | |
| 2023/0039485 A1 | 2/2023 | Karri | |

* cited by examiner

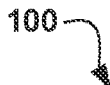

100

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

MACHINE ALTERING PROGRAM 150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

$$\psi = \cos\left(\frac{\theta}{2}\right)\bar{y} + \sin\left(\frac{\theta}{2}\right)e^{\varphi i}\,\bar{x}$$

$$\bar{y} = \begin{pmatrix} 1 \\ 0 \end{pmatrix}$$

$$\bar{x} = \begin{pmatrix} 0 \\ 1 \end{pmatrix}$$

400

PROACTIVE ALTERATION OF MACHINE BASED ON PREDICTED PROBLEM

BACKGROUND

The present invention relates generally to the field of computing, and more particularly to a system for altering a machine based on a predicted problem in a multi-machine environment.

Machines, such as robots, are currently used to perform a wide variety of activities in an industrial environment. In any industrial environment, there may be different types of machines performing a variety of activities. These machines have differing skills and capabilities, and can perform the activities individually and/or collaboratively. For example, one machine may be used to cut metal objects, whereas another machine may be used to move objects. Additionally, human workers may collaborate with the machines in performing the variety of activities in the industrial environment. As automation becomes commonplace, the demand for machines and robotic technology is expected to increase in the coming decades.

SUMMARY

According to one embodiment, a method, computer system, and computer program product for altering a machine based on a predicted problem in a multi-machine environment is provided. The embodiment may include receiving data relating to an activity and functionalities of a primary machine in a multi-machine environment. The embodiment may also include executing a digital twin simulation of a digital twin model of the primary machine performing the activity in accordance with the functionalities. The embodiment may further include identifying a problem condition with at least one component of the primary machine in executing one or more steps of the activity based on the digital twin simulation. The embodiment may also include in response to determining the primary machine is not capable of performing an alternative activity with the problem condition, deploying one or more secondary machines having at least one substitute component for the at least one component of the primary machine to collaborate with the primary machine.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

DETAILED DESCRIPTION

Figure 2:
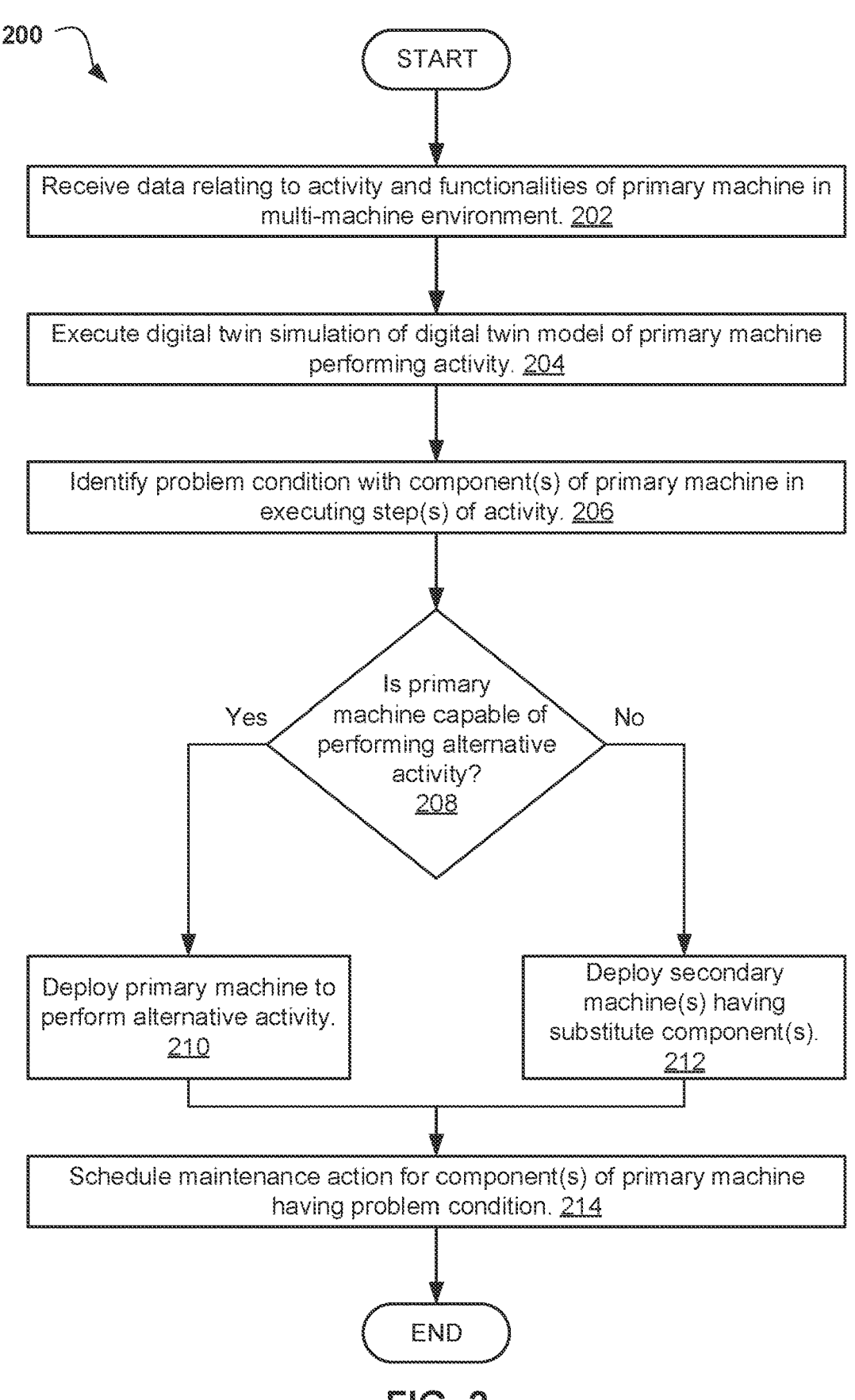
FIG. 2 illustrates an operational flowchart for altering a machine based on a predicted problem in a multi-machine environment in a machine alteration process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for altering a machine based on a predicted problem in a multi-machine environment. The following described exemplary embodiments provide a system, method, and program product to, among other things, execute a digital twin simulation of a digital twin model of a primary machine performing an activity in accordance with functionalities and, accordingly, identify a problem condition with at least one component of the primary machine in executing one or more steps of the activity. Therefore, the present embodiment has the capacity to improve industrial machine technology by proactively increasing the capabilities of a machine having a problem component in any multi-machine environment.

As previously described, machines, such as robots, are currently used to perform a wide variety of activities in an industrial environment. In any industrial environment, there may be different types of machines performing a variety of activities. These machines have differing skills and capabilities, and can perform the activities individually and/or collaboratively. For example, one machine may be used to cut metal objects, whereas another machine may be used to move objects. Additionally, human workers may collaborate with the machines in performing the variety of activities in the industrial environment. As automation becomes commonplace, the demand for machines and robotic technology is expected to increase in the coming decades. When a machine is performing an activity, a problem may occur with one or more components. For example, the machine may be immobile and/or a gripper of the machine may not be able to handle the weight of an object. This problem is typically addressed by predicting a maintenance action for the machine. However, predicting a maintenance action for the machine fails to utilize alternative machinery as an effective substitute to successfully perform the activity.

It may therefore be imperative to have a system in place to utilize alternative machinery as an effective substitute to successfully perform the activity. Thus, embodiments of the present invention may provide advantages including, but not limited to, proactively increasing the capabilities of a machine having a problem component in any multi-machine environment, utilizing alternative machinery as an effective substitute to successfully perform the activity, and dynamically creating an appropriate workflow sequence such that the machine and alternative machinery can execute the activity collaboratively. The present invention does not require that all advantages need to be incorporated into every embodiment of the invention.

According to at least one embodiment, in a multi-machine environment, data relating to an activity and functionalities of a primary machine may be received in order to create execute a digital twin simulation of a digital twin model of the primary machine performing the activity in accordance with the functionalities. Upon executing the digital twin simulation, a problem condition with at least one component of the primary machine in executing one or more steps of the activity may be identified based on the digital twin simulation so that it may be determined whether the primary machine is capable of performing an alternative activity with the problem condition. According to at least one embodiment, in response to determining the primary machine is not capable of performing the alternative activity with the problem condition, one or more secondary machines having at least one substitute component for the at least one component of the primary machine may be deployed to collaborate with the primary machine.

According to at least one other embodiment, in response to determining the primary machine is capable of performing the alternative activity with the problem condition, the primary machine may be deployed to perform the alternative activity. In either embodiment, a maintenance action for the at least one component of the primary machine having the problem condition may be scheduled upon completion of the activity or alternative activity.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to execute a digital twin simulation of a digital twin model of a primary machine performing an activity in accordance with functionalities and, accordingly, identify a problem condition with at least one component of the primary machine in executing one or more steps of the activity.

Referring to FIG. 1, an exemplary computing environment 100 is depicted, according to at least one embodiment. Computing environment 100 contains an example of an environment for the execution of at least some of the computer code involved in performing the inventive methods, such as a machine altering program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a machine, a robotic device, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the machine altering program 150 may be a program capable of receiving data relating to an activity and functionalities of a primary machine in a multi-machine environment, executing a digital twin simulation of a digital twin model of a primary machine performing an activity in accordance with functionalities, identifying a problem condition with at least one component of the primary machine in executing one or more steps of the activity, proactively increasing the capabilities of a machine having a problem component in any multi-machine environment, utilizing alternative machinery as an effective substitute to successfully perform the activity, and dynamically creating an appropriate workflow sequence such that the machine and alternative machinery can execute the activity collaboratively. Furthermore, notwithstanding depiction in computer 101, the machine altering program 150 may be stored in and/or executed by, individually or in any combination, end user device 103, remote server 104, public cloud 105, and private cloud 106. The machine altering method is explained in further detail below with respect to FIG. 2.

Referring now to FIG. 2, an operational flowchart for altering a machine based on a predicted problem in a multi-machine environment in a machine alteration process 200 is depicted according to at least one embodiment. At 202, the machine altering program 150 receives the data relating to the activity and the functionalities of the primary machine in the multi-machine environment. As used herein, "primary machine" means a machine that is initially assigned to perform the activity.

The data relating to the activity may include the type of activity to be performed in the multi-machine environment. Examples of an activity may include, but are not limited to, assembling objects in a manufacturing facility, moving objects at a construction site, and transporting objects from one location to another, (e.g., moving a product from an assembly line to a shipping area). The data relating to the activity may also include one or more objects associated with the activity. Examples of an object may include, but are not limited to, a shipping container, an automobile, a device on an assembly line, construction materials, and/or any object capable of being moved from a source to a destination, i.e., from one location to another location. The data relating to the activity may further include the time required to complete the activity. For example, the activity may typically take two hours to complete.

The data relating to the functionalities of the primary machine may include types of functionalities and a sequence in which the functionalities are performed during the activity. Examples of the functionalities may include, but are not limited to, applying coolant to an object, lasering the object, gripping the object, cleaning the object, removing material from an object, and/or lubricating the object. The data relating to the functionalities may also include the modules that perform the functions. The modules may include, but are not limited to, a lubricating module, a cleaning module, a coolant module, a laser module, and/or other modules. Module and component are used interchangeably herein. According to at least one embodiment, the data relating to the functionalities may be received from IoT feeds from various components of the primary machine. According to at least one other embodiment, the data relating to the functionalities may be received from a machine catalog and/or historical usage.

Then, at 204, the machine altering program 150 executes the digital twin simulation of the digital twin model of the primary machine performing the activity. The digital twin simulation is executed in accordance with the functionalities described above with respect to step 202. The machine altering program 150 may use known techniques to create the digital twin model of the primary machine, and this digital twin model may be used in the digital twin simulation. The digital twin of the primary machine used in the simulation may have the same specifications the primary machine has in the real-world. Additionally, the digital twin of the primary machine used in the simulation may also have the same materials the primary machine is made of in the real-world. For example, the arm of the primary machine may be made of a metal, such as titanium, and the gripper may be made of the same or different type of metal (e.g., aluminum), or the gripper may be made of plastic. In this manner, maximum accuracy may be preserved during the digital twin simulation.

The digital twin simulation may be executed in accordance with the functionalities the primary machine makes in the real-world while performing the activity. For example, when the activity is assembling automobile parts on an assembly line, the functionalities may include picking up a door and a hood cover and placing them on a chassis. Continuing the example, the functionalities may also include applying a laser to weld gears and transmission components, and subsequently applying coolant to the welded components.

Next, at 206, the machine altering program 150 identifies the problem condition with the at least one component of the primary machine in executing the one or more steps of the activity. The problem condition is identified based on the digital twin simulation. As used herein, "problem condition" means a function associated with the at least one component has been reduced. As described above with respect to step 204, the machine altering program 150 executes the digital twin simulation of the digital twin model of the primary machine performing the activity, during which the primary machine may perform the functionalities the primary machine makes in the real-world. During the digital twin simulation, a problem condition may occur with the at least one component of the primary machine. Examples of the problem condition may include, but are not limited to, a reduction in the functionality of the lubricating module, the cleaning module, the coolant module, the laser module, any other modules, and/or a failure of the at least one component to complete one or more steps of the activity within a typical timeframe.

For example, the primary machine may have lost mobility, causing a delay in completing the one or more steps of the activity. In another example, a gripper module may be unable to pick up a door and a hood cover and place them on a chassis or may drop the door and hood cover. In another example, the laser module may be unable to weld gears and transmission components. In yet another example, the coolant module may be clogged and unable to apply coolant to the welded components.

According to at least one embodiment, identifying the problem condition with the at least one component of the primary machine in executing the one or more steps of the activity may also include detecting whether the primary machine requires maintenance. The primary machine may require maintenance when the functionality associated with the at least one component cannot be restored without external intervention (e.g., by a human and/or other device). For example, when the functionality associated with the at least one component can be restored by shutting down the primary machine for a specified period of time, the primary machine may not require maintenance.

Then, at 208, the machine altering program 150 determines whether the primary machine is capable of performing the alternative activity with the problem condition. The determination may be made based on the digital twin simulation.

According to at least one embodiment, the determination may be made based on historical data associated with the alternative activity. The historical data may indicate which modules are required to complete the alternative activity. For example, when the activity is assembling automobile parts on the assembly line, the primary machine may not be able to complete the activity when the functionality of the laser module and/or the coolant module has been reduced. However, continuing the example, the alternative activity (e.g., transporting objects from one location to another) may not require the functions associated with the laser module and/or the coolant module. Thus, in this example, the primary machine is capable of performing the alternative activity notwithstanding the problem condition.

According to at least one other embodiment, the determination may be made by performing an additional digital twin simulation for the alternative activity. The additional digital twin simulation may include the digital twin of the primary machine performing the one or more steps of the alternative activity without the at least one component having the problem condition. For example, the digital twin of the primary machine may transport objects from one location to another without using the laser module and the coolant module. In this example, assuming the digital twin of the primary machine does not drop or otherwise damage the objects during the digital twin simulation, the determination may be made that the primary machine is capable of performing the alternative activity notwithstanding the problem condition.

In response to determining the primary machine is capable of performing the alternative activity with the problem condition (step 208, "Yes" branch), the machine alteration process 200 proceeds to step 210 to deploy the primary machine to perform the alternative activity. In response to determining the primary machine is not capable of performing the alternative activity with the problem condition (step 208, "No" branch), the machine alteration process 200 proceeds to step 212 to deploy the one or more secondary machines having the at least one substitute component for the at least one component of the primary machine to collaborate with the primary machine.

Next, at 210, the machine altering program 150 deploys the primary machine to perform the alternative activity. In response to determining the primary machine is capable of performing the alternative activity with the problem condition, the machine altering program 150 may send a signal to the primary machine to stop performing the activity.

According to at least one embodiment, where the primary machine is immobile, one or more mobile robotic devices may be utilized to transport the primary machine to a location of the alternative activity. According to at least one other embodiment, where the primary machine is mobile, the signal may cause the primary machine to move to the location of the alternative activity. In performing the alternative activity, the primary machine may utilize any module whose functionality is maintained (i.e., has not been reduced).

Then, at 212, the machine altering program 150 deploys the one or more secondary machines having the at least one substitute component for the at least one component of the primary machine to collaborate with the primary machine. As used herein, "secondary machine" means a backup machine that is assigned to assist the primary machine in performing the activity. The at least one substitute component may be a compatible component for the at least one component of the primary machine having the problem condition.

For example, the gripper module of the primary machine may have the problem condition. In this example, the at least one substitute component may be a gripper module of the one or more secondary machines. In another example, the laser module of the primary machine may have the problem condition. In this example, the at least one substitute component may be a laser module of the one or more secondary machines. In yet another example, the coolant module of the primary machine may have the problem condition. In this example, the at least one substitute component may be a coolant module of the one or more secondary machines.

The one or more mobile robotic devices described above with respect to step 210 may be utilized to transport the one or more secondary machines to a location of the primary machine in response to determining the one or more secondary machines are immobile. Contrarily, where the one or more secondary machines are mobile, a signal sent by the machine altering program 150 may cause the one or more secondary machines to move to the location of the primary machine.

According to at least one embodiment, deploying the one or more secondary machines having the at least one substitute component for the at least one component of the primary machine may include causing the one or more secondary machines to attach the at least one substitute component to a problem area of the primary machine. For example, where the gripper module of the primary machine has the problem condition, the one or more secondary machines may attach a substitute gripper module of the one or more secondary machines to the problem area (e.g., an arm) of the primary machine. In another example, where the laser module of the primary machine has the problem condition, the one or more secondary machines may attach a substitute laser module of the one or more secondary machines to the problem area (e.g., a laser housing) of the primary machine.

According to at least one other embodiment, deploying the one or more secondary machines having the at least one substitute component for the at least one component of the primary machine may include causing the one or more secondary machines to alternate with the primary machine in performing the one or more steps of the activity. For example, where the gripper module of the primary machine has the problem condition, the primary machine may perform a step that does not require use of the gripper module, and then the one or more secondary machines may perform a subsequent step that requires the use of the gripper module of the one or more secondary machines. In another example, where the laser module of the primary machine has the problem condition, the primary machine may perform a step that does not require use of the laser module, and then the one or more secondary machines may perform a subsequent step that requires the use of the laser module of the one or more secondary machines.

In either of the embodiments described above, a sequence of the one or more steps of the activity may be adapted based on one or more capabilities of the at least one substitute component of the one or more secondary machines. For example, the original sequence of the activity may include performing step A, followed by step B, and then step C. Continuing the example, to accommodate the one or more secondary machines in collaborating with the primary machine, the sequence may be adapted to include performing step B first, followed by step A, and then step C.

Next, at 214, the machine altering program 150 schedules the maintenance action for the at least one component of the primary machine having the problem condition. The maintenance action may be scheduled after the primary machine is finished performing the activity or the alternative activity.

As described above with respect to step 206, the primary machine may require maintenance when the functionality associated with the at least one component cannot be restored without external intervention (e.g., by a human and/or other device). For example, when the functionality associated with the coolant module is not able to be restored by shutting down the primary machine for the specified period of time, the maintenance may be scheduled for the coolant module of the primary machine.

Figure 3:
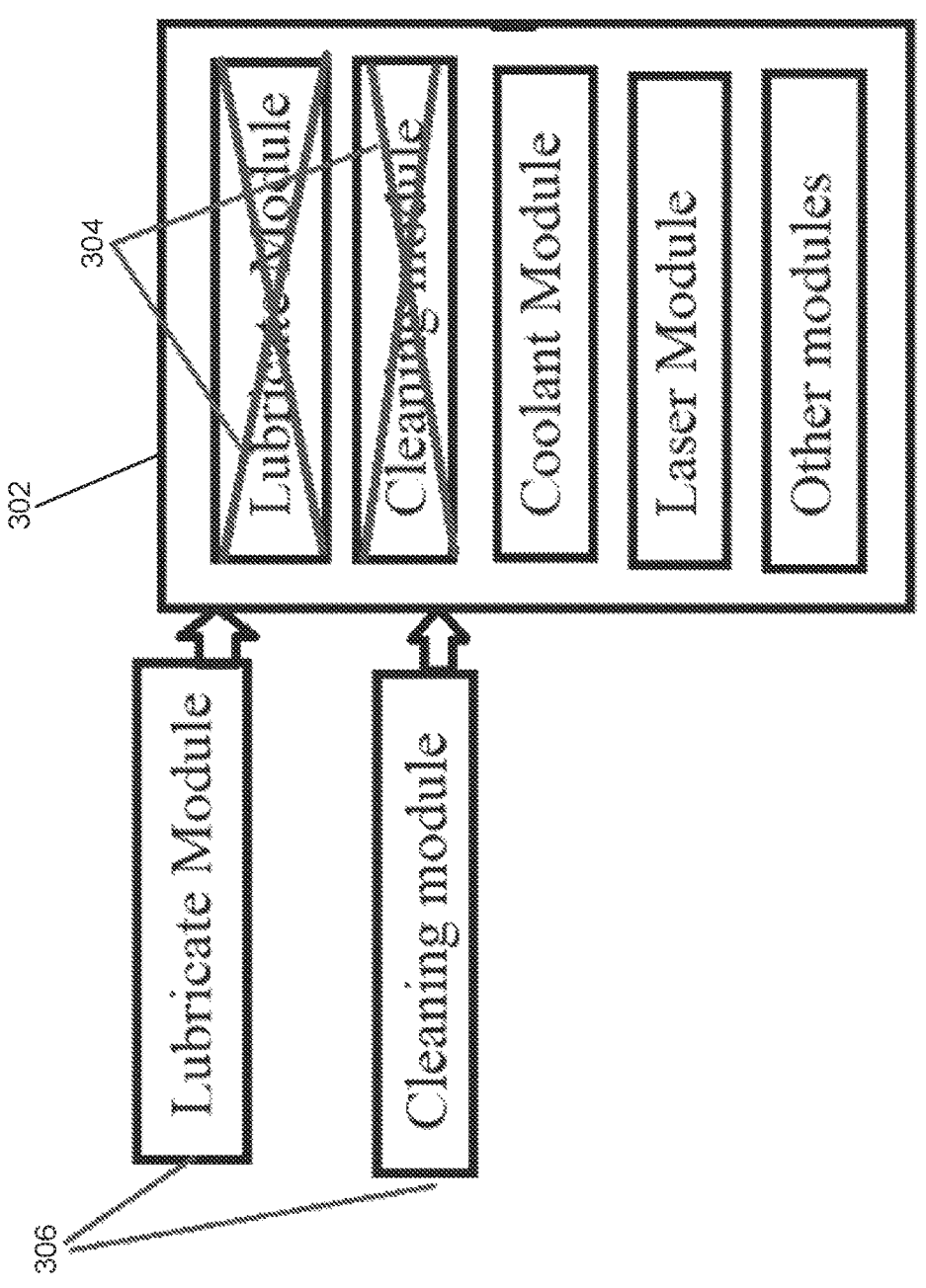
FIG. 3 is an exemplary diagram depicting available resources of a primary machine and a secondary machine after the execution of a digital twin simulation according to at least one embodiment.

Referring now to FIG. 3, an exemplary diagram 300 depicting available resources of a primary machine and a secondary machine after the execution of a digital twin simulation is shown according to at least one embodiment. In the diagram 300, the primary machine 302 may include a lubricate module, a cleaning module, a coolant module, a laser module, and other modules. Upon execution of the digital twin simulation, one or more problem condition components 304 may include the lubricate module and the cleaning module. For example, the lubricate module may not be able to properly lubricate an object and the cleaning module may not be able to adequately clean the object. In the diagram 300, the one or more secondary machines that are deployed to collaborate with the primary machine may be equipped with the at least one substitute component 306. The at least one substitute component 306 may include the lubricate module and the cleaning module. As described above with respect to the description of FIG. 2, the at least one substitute component 306 may be attached to the primary machine, or the at least one substitute component 306 may alternate with the primary machine in performing the one or more steps of the activity.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
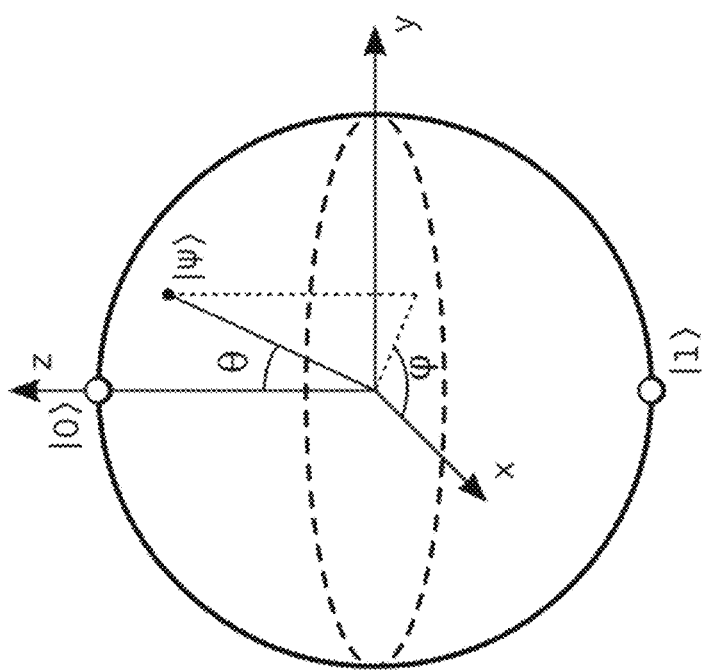
FIG. 4 is an exemplary diagram depicting an application of Hilbert space methodology according to at least one embodiment.

Referring now to FIG. 4, an exemplary diagram depicting an application of Hilbert space methodology is shown according to at least one embodiment. According to at least one embodiment of the present invention, a Hilbert space methodology may be utilized in the implementation of one or more steps of the present invention. The mixing of logical and physical functions may be treated as a complex number, such as a+bi where, $i = \sqrt{-1}$. The variable a provides the real part of the equation, while b provides the imaginary part. Next, Euler's notation may be provided to move around a circle that describes the continuum of a virtual event and a physical event. The virtual event may be the executed digital twin simulation and the physical event may be the functionalities performed in the real world. Euler's notation enables embodiments of the present invention to mix together imaginary and real components with $e^{ix}=\cos(x)+i\sin(x)$. The real axis may include real valued numbers that have both positive and negative values. Assuming the axis trends to positives, then physical functions may not be used. The imaginary axis may represent logical components. Within quadrant I of the circle, both physical and logical components may be combined together to assign a machine to a task. Within quadrant II of the circle, there may be only logical components such as strong CPUs. Within quadrant III of the circle, minimal logical and physical components may represent light work. Finally, within quadrant IV of the circle, there may be only physical components which take place during a demanding job.

Teaming may then be added to the notation $e^{ix}=\cos(x)+i\sin(x)$ which becomes $e^{t+ix}=e^t\,e^{ix}=\cos(t)\cos(x)+i\sin(x)\cos(t)$. The t metric may encode a team criteria, which may influence where a machine's capability is positioned in a circle's circumference. Deep learning may assign machine components to points along the metric circle. A collection of events and features may be aggregated across many different jobs. The label of each component that may be used within an event may be a continuous value on the unit circle $\cos(x)+i\sin(x)$.

Different points along the circle may indicate where the machine's capability is available, which may map to the type of job in which the machine is able to participate. The team dimension may be represented as in FIG. 4.

The teaming dimension may allow for the addition of teaming capabilities to the machine, which may move the machine into a Hilbert space that is acceptable for a job. Jobs may be aligned to spaces on the Hilbert space, which may assist in moving a machine around when the machine has specific malfunctioning parts to jobs that can still optimize the performance of the machine.

Finally, traditional engineering surface tension or strain analysis techniques may then be applied to the resulting shape in Hilbert space to find local minima and maxima that describe the optimal correspondence of machines (e.g., original vs. replacement) across the entire domain of multiple machines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of altering a machine based on a predicted problem in a multi-machine environment, the method comprising:

receiving data relating to an operational activity and functionalities of a primary machine from various components of the primary machine in a multi-machine environment;

executing a digital twin simulation of a digital twin model of the primary machine performing the operational activity on an object in accordance with the functionalities;

identifying a problem condition with at least one component of the primary machine in executing one or more steps of the operational activity based on the digital twin simulation;

determining whether the primary machine is capable of performing an alternative operational activity on a different object with the problem condition, wherein the alternative operational activity is different than the operational activity;

in response to determining the primary machine is capable of performing the alternative operational activity with the problem condition, causing the primary machine to move to location of the alternative operational activity to perform the alternative operational activity;

in response to determining the primary machine is not capable of performing the alternative operational activity on the different object with the problem condition, causing one or more secondary machines having at least one substitute component for the at least one component of the primary machine to move to location of the primary machine and to attach the at least one substitute component to a problem area of the primary machine with the problem condition to assist the primary machine in performing the operational activity on the object.

2. The computer-based method of claim 1, further comprising:

scheduling a maintenance action for the at least one component of the primary machine having the problem condition.

3. The computer-based method of claim 1, wherein one or more mobile robotic devices are utilized to transport the one or more secondary machines to a location of the primary machine.

4. The computer-based method of claim 1, wherein a sequence of the one or more steps of the operational activity is adapted based on one or more capabilities of the at least one substitute component of the one or more secondary machines.

5. The computer-based method of claim 1, wherein the functionalities of the primary machine are selected from a group consisting of applying coolant to the object, lasering the object, gripping the object, and cleaning the object.

6. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving data relating to an operational activity and functionalities of a primary machine from various components of the primary machine in a multi-machine environment;

executing a digital twin simulation of a digital twin model of the primary machine performing the operational activity on an object in accordance with the functionalities;

identifying a problem condition with at least one component of the primary machine in executing one or more steps of the operational activity based on the digital twin simulation;

determining whether the primary machine is capable of performing an alternative operational activity on a different object with the problem condition, wherein the alternative operational activity is different than the operational activity;

in response to determining the primary machine is capable of performing the alternative operational activity with the problem condition, causing the primary machine to move to location of the alternative operational activity to perform the alternative operational activity;

in response to determining the primary machine is not capable of performing the alternative operational activity on the different object with the problem condition, causing one or more secondary machines having at least one substitute component for the at least one component of the primary machine to move to location of the primary machine and to attach the at least one substitute component to a problem area of the primary machine with the problem condition to assist the primary machine in performing the operational activity on the object.

7. The computer system of claim 6, the method further comprising:

scheduling a maintenance action for the at least one component of the primary machine having the problem condition.

8. The computer system of claim 6, wherein one or more mobile robotic devices are utilized to transport the one or more secondary machines to a location of the primary machine.

9. The computer system of claim 6, wherein a sequence of the one or more steps of the operational activity is adapted based on one or more capabilities of the at least one substitute component of the one or more secondary machines.

10. The computer system of claim 6, wherein the functionalities of the primary machine are selected from a group consisting of applying coolant to the object, lasering the object, gripping the object, and cleaning the object.

11. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving data relating to an operational activity and functionalities of a primary machine from various components of the primary machine in a multi-machine environment;

executing a digital twin simulation of a digital twin model of the primary machine performing the operational activity on an object in accordance with the functionalities;

identifying a problem condition with at least one component of the primary machine in executing one or more steps of the operational activity based on the digital twin simulation;

determining whether the primary machine is capable of performing an alternative operational activity on a different object with the problem condition, wherein the alternative operational activity is different than the operational activity;

in response to determining the primary machine is capable of performing the alternative operational activity with the problem condition, causing the primary machine to move to location of the alternative operational activity to perform the alternative operational activity;

in response to determining the primary machine is not capable of performing the alternative operational activity on the different object with the problem condition, causing one or more secondary machines having at least one substitute component for the at least one component of the primary machine to move to location of the primary machine and to attach the at least one substitute component to a problem area of the primary machine with the problem condition to assist the primary machine in performing the operational activity on the object.

12. The computer program product of claim 11, the method further comprising:

scheduling a maintenance action for the at least one component of the primary machine having the problem condition.

13. The computer program product of claim 11, wherein one or more mobile robotic devices are utilized to transport the one or more secondary machines to a location of the primary machine.

14. The computer program product of claim 11, wherein a sequence of the one or more steps of the operational activity is adapted based on one or more capabilities of the at least one substitute component of the one or more secondary machines.

* * * * *